United States Patent [19]
Nagler

[11] Patent Number: 4,482,217
[45] Date of Patent: Nov. 13, 1984

[54] PLÖSSL TYPE EYEPIECE FOR USE IN ASTRONOMICAL INSTRUMENTS

[76] Inventor: Albert Nagler, 15 Green Hill La., Spring Valley, N.Y. 10977

[21] Appl. No.: 467,877

[22] Filed: Feb. 18, 1983

[51] Int. Cl.³ .................... G02B 3/00; G02B 25/00
[52] U.S. Cl. ........................... 350/410; 350/479
[58] Field of Search ........................ 350/410, 479

[56] References Cited
FOREIGN PATENT DOCUMENTS
0052014 4/1980 Japan .................... 350/410

Primary Examiner—John K. Corbin
Assistant Examiner—Rebecca D. Gass
Attorney, Agent, or Firm—William P. Keegan

[57] ABSTRACT

A Plössl type eyepiece for astronomical instruments in which the external flint elements of the symmetrical achromatic doublets are double concave elements.

1 Claim, 1 Drawing Figure

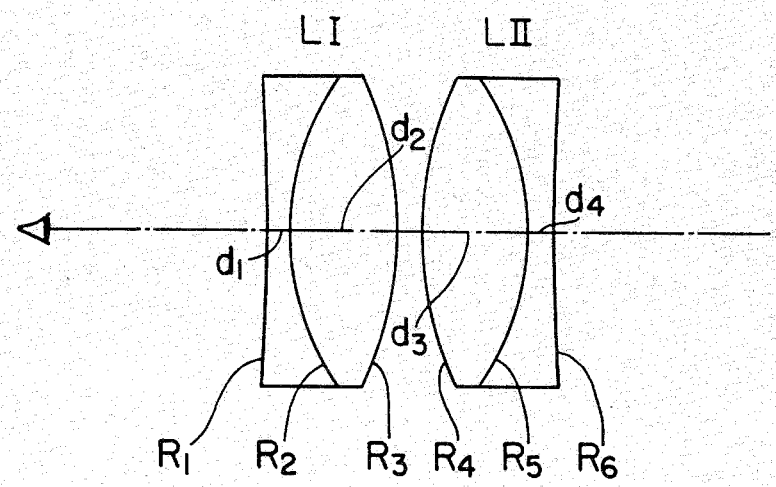

PLöSSL TYPE EYEPIECE FOR USE IN ASTRONOMICAL INSTRUMENTS

FIELD OF THE INVENTION

The invention relates to an eyepiece for astronomical instruments, and more particularly to a Plössl type eyepiece having improved coma and astigmatism correction.

BACKGROUND OF THE INVENTION

As is well known in the art, a Plössl type eyepiece is a relatively wide field eyepiece comprising two achromatic doublets in which the crown elements usually face each other. Such eyepieces are capable of good performance, i.e., acceptable degrees of aberrations, to about a 50° field. Generally, in order to minimize aberrations at the exit pupil and distortion, all air glass surfaces of the eyepiece are made convex. However, thre have been Plössl type eyepieces used commercially in astronomical instruments in which the external flint surfaces are plano.

GENERAL DESCRIPTION OF THE INVENTION

For astronomical viewing, pupil aberrations and geometric distortions are not as important as the correction of coma and astigmatism which control image sharpness at the edge of the field.

Accordingly, it is an object of the present invention to provide an improved Plössl type eyepiece for use with astronomical instruments.

It is another object of the invention to provide a Plössl type eyepiece having improved coma and astigmatism aberrations at the edge of the field of view.

In carrying out the invention, there is provided a symmetrical eyepiece comprising two achromatic doublets in which the external surfaces of the flint elements are concave. Such a lens configuration provides a significant improvement in the correction of astigmatism and coma at the edge of the field. This results in a sharper image for large field angles with a relatively small undercorrected field curvature.

BRIEF DESCRIPTION OF THE DRAWING

The single FIGURE of the drawing schematically shows a Plössl type eyepiece according to the present invention.

DETAILED DESCRIPTION OF THE INVENTION

In a 26 mm. focal length Plössl type eyepiece as shown in the drawing, according to one embodiment of the invention, the external concave lens elements are flint glass having a refractive index $N_d$ equal to 1.667 and an Abbe number $\nu$ of 33, and the convex elements are heavy crown glass having a refractive index $N_d$ equal to 1.658 and an Abbe number $\nu$ of 51. The lenses LI and LII are separated by an air space of one millimeter. Further lens data for the particular embodiment are shown in the accompanying table wherein lens radii and lens thicknesses at the optical axis are given in millimeters.

| Lens | Radii | Axial Thickness |
|---|---|---|
| LI | R1 = −169.87<br>R2 = +21.598<br>R3 = −29.44 | d1 = 2<br>d2 = 9 |
| LII | R4 = +29.44<br>R5 = −21.598<br>R6 = +169.87 | d3 = 9<br>d4 = 2 |

An eyepiece constructed according to the foregoing data will be well corrected for spherical aberration, and axial and lateral color. Moreover, the astigmatism at a 25° semi field will have the following values: tangential focus position +0.31 mm. from paraxial; sagittal focus position −0.84 mm. from paraxial, which results in an astigmatism of 1.15 mm. Coma at a 25° semi field at f/5 relative aperture is 0.34 mm.

Having thus described the invention, it is to be understood that the specification and the drawing are to be interpreted as illustrative and not in a limiting sense.

What is claimed is:

1. A Plössl type eyepiece comprising a pair of symmetrical achromatic doublets wherein the convex crown elements face each other and the external flint elements are double concave elements and wherein, for a 26 millimeter focal length eyepiece, the lens data conforms substantially to the following table wherein lens radii and axial thicknesses are given in millimeters:

| Lens | Radii | Axial Thickness | Refractive Index | Abbe Number |
|---|---|---|---|---|
| LI | R1 = −169.87 | d1 = 2 | $N_d$ = 1.667 | $\nu$ = 33 |
|  | R2 = +21.598 | d2 = 9 | $N_d$ = 1.658 | $\nu$ = 51 |
|  | R3 = −29.44 |  |  |  |
| LII | R4 = +29.44 |  |  |  |
|  | R5 = −21.598 | d3 = 9 | $N_d$ = 1.658 | $\nu$ = 51 |
|  | R6 = +169.87 | d4 = 2 | $N_d$ = 1.667 | $\nu$ = 33 | and wherein the lens separation is one millimeter.

* * * * *